US011619406B2

(12) United States Patent
Kimura et al.

(10) Patent No.: US 11,619,406 B2
(45) Date of Patent: Apr. 4, 2023

(54) AIR CONDITIONING SYSTEM

(71) Applicant: KIMURA KOHKI CO., LTD., Osaka (JP)

(72) Inventors: Keiichi Kimura, Yao (JP); Katsuhiro Urano, Sakai (JP); Takayuki Ishida, Yao (JP); Kazuya Goto, Yao (JP)

(73) Assignee: KIMURA KOHKI CO., LTD., Osaka (JP)

( * ) Notice: Subject to any disclaimer, the term of this patent is extended or adjusted under 35 U.S.C. 154(b) by 163 days.

(21) Appl. No.: 17/357,521

(22) Filed: Jun. 24, 2021

(65) Prior Publication Data
US 2022/0018560 A1 Jan. 20, 2022

(30) Foreign Application Priority Data

Jul. 16, 2020 (JP) .............................. JP2020-121767

(51) Int. Cl.
*F24F 8/30* (2021.01)
*F24F 1/0087* (2019.01)
*F24F 1/0038* (2019.01)
*F24F 8/22* (2021.01)
*F24F 13/28* (2006.01)
*F24F 13/06* (2006.01)

(52) U.S. Cl.
CPC .............. *F24F 8/30* (2021.01); *F24F 1/0038* (2019.02); *F24F 1/0087* (2019.02); *F24F 8/22* (2021.01); *F24F 13/06* (2013.01); *F24F 13/28* (2013.01)

(58) Field of Classification Search
CPC ...... F24F 8/30; F24F 8/22; F24F 13/28; F24F 13/06
See application file for complete search history.

(56) References Cited

FOREIGN PATENT DOCUMENTS

| EP | 1455141 A1 | 9/2004 |
| EP | 3521713 A2 | 8/2019 |
| JP | 3189532 U * | 3/2014 |
| JP | 2016070620 A | 5/2016 |
| JP | 2020051721 A | 4/2020 |
| KR | 200323104 Y1 * | 8/2003 |
| KR | 20040017119 A | 2/2004 |
| WO | 2012068569 A1 | 5/2012 |

* cited by examiner

*Primary Examiner* — Robert A Hopkins
(74) *Attorney, Agent, or Firm* — Alleman Hall Creasman & Tuttle LLP

(57) ABSTRACT

An air conditioning system includes: an intake unit configured to take in return air of an indoor space from a ceiling of the indoor space; an outdoor air processing unit configured to supply outdoor air while exhausting the return air taken in via the intake unit to outdoors; an air conditioner configured to supply, as air-conditioning air, mixed air of the return air taken in via the intake unit and the outdoor air supplied by the outdoor air processing unit; and at least one radiation unit disposed in the indoor space in a manner to surround the intake unit, the radiation unit being configured to radiate heat of the air-conditioning air supplied by the air conditioner while discharging the air-conditioning air to the indoor space.

20 Claims, 7 Drawing Sheets

AIR CONDITIONING SYSTEM

CROSS-REFERENCE TO RELATED APPLICATION

This application claims priority to and the benefit of Japanese Patent Application No. 2020-121767, filed on Jul. 16, 2020, the entire disclosure of which is incorporated herein by reference.

TECHNICAL FIELD

The present disclosure relates to air conditioning systems.

BACKGROUND

For example, as disclosed in Japanese Laid-Open Patent Application Publication No. 2016-70620, conventional indoor air conditioning uses convection air conditioning, in which indoor air temperature control is performed in a manner to circulate cool air or warm air blown from an air conditioner.

SUMMARY

In convection air conditioning, respiratory droplets and aerosols tend to spread, which increases the risk of being infected with an infectious disease. In addition, in convection air conditioning, temperature irregularity tends to occur, which degrades the comfort of the air conditioning.

In order to solve the above-described problems, an air conditioning system according to one aspect of the present disclosure includes: an intake unit configured to take in return air of an indoor space from a ceiling of the indoor space; an outdoor air processing unit connected to the intake unit, the outdoor air processing unit being configured to supply outdoor air while exhausting the return air taken in via the intake unit to outdoors; an air conditioner connected to the intake unit and the outdoor air processing unit, the air conditioner being configured to supply, as air-conditioning air, mixed air of the return air taken in via the intake unit and the outdoor air supplied by the outdoor air processing unit; and at least one radiation unit connected to the air conditioner and disposed in the indoor space in a manner to surround the intake unit, the radiation unit being configured to radiate heat of the air-conditioning air supplied by the air conditioner while discharging the air-conditioning air to the indoor space. The air conditioning system is configured to air-condition the indoor space so as to radiate the heat from the radiation unit while generating an induced air stream in the intake unit to ventilate the indoor space.

The above and further objects, features, and advantages of the present disclosure will more fully be apparent from the following detailed description of preferred embodiments with accompanying drawings.

DESCRIPTION OF EMBODIMENTS

Figure 1:
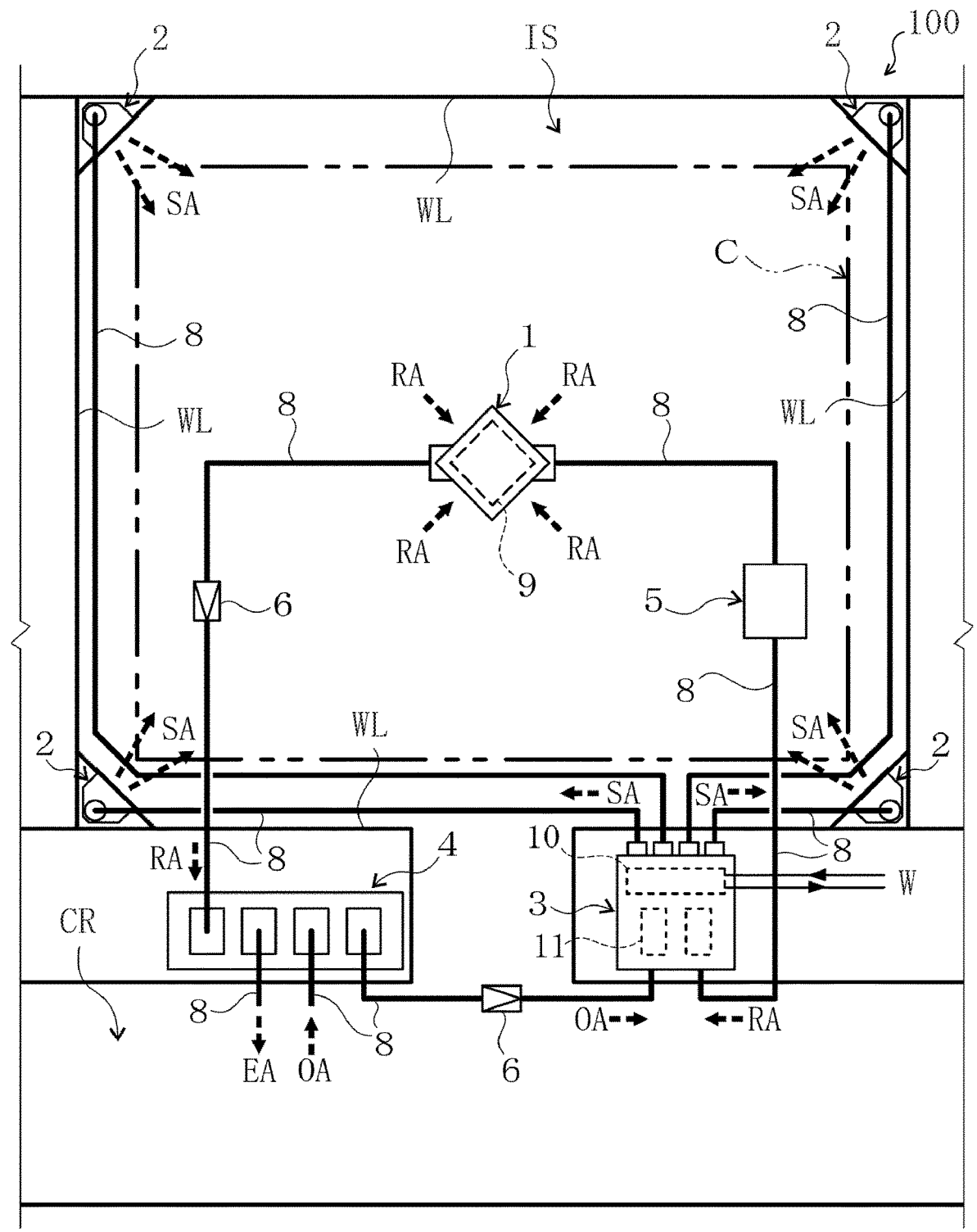
FIG. 1 is a schematic plan view showing one example of the configuration of an air conditioning system according to one embodiment.
Figure 2:
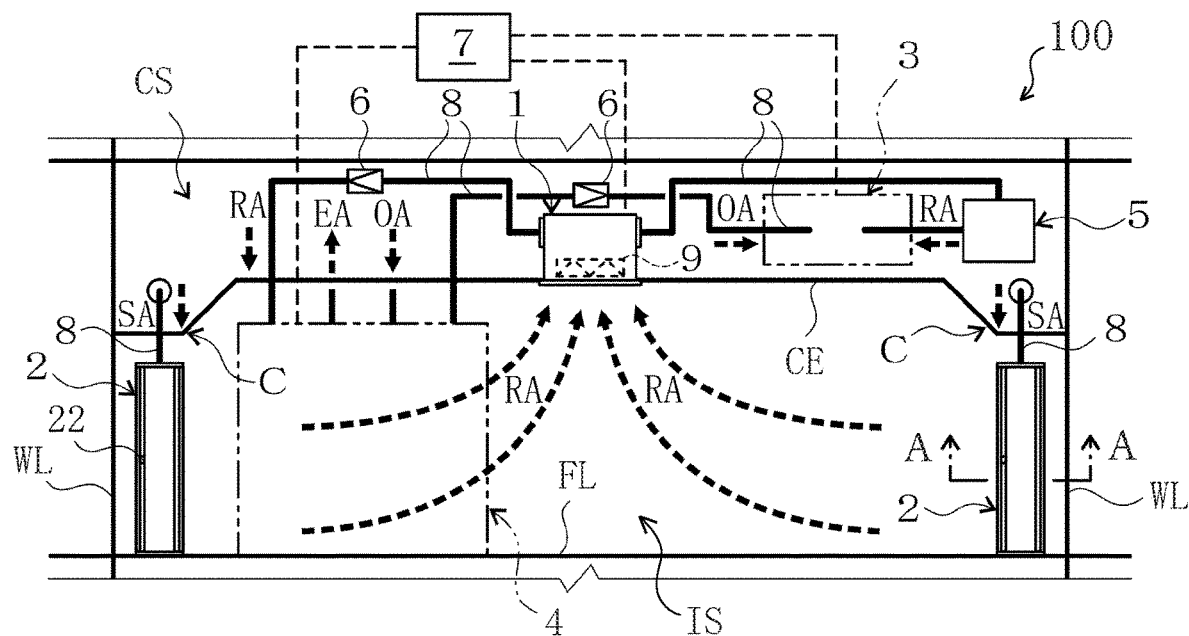
FIG. 2 is a schematic front view of the air conditioning system of FIG. 1.
Figure 3:
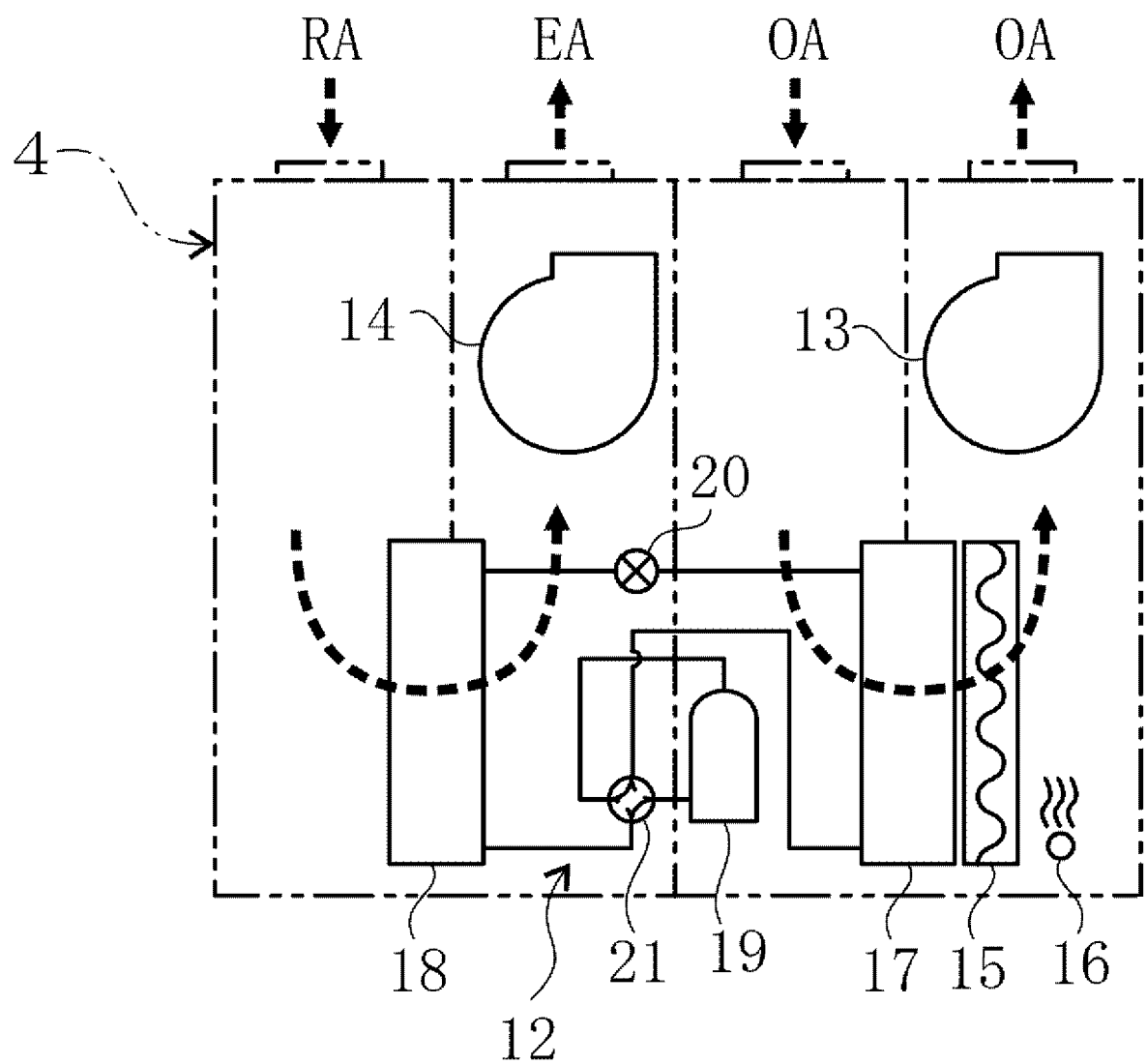
FIG. 3 schematically illustrates one example of the configuration of an outdoor air processing unit according to the embodiment.
Figure 4:
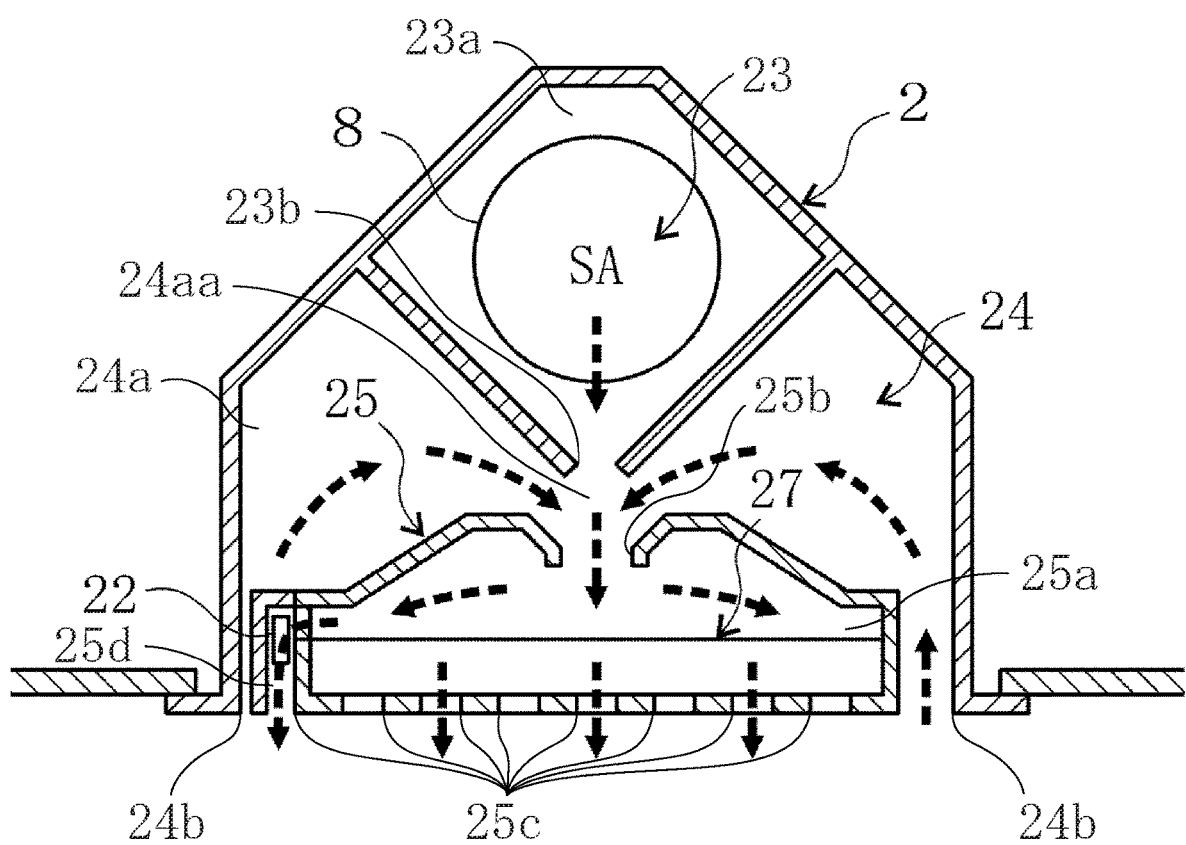
FIG. 4 is a cross-sectional view showing one example of a radiation unit of FIG. 2, the cross-sectional view being taken along line A-A of FIG. 2.

First, each aspect of the present disclosure is described. An air conditioning system according to one aspect of the present disclosure includes: an intake unit configured to take in return air of an indoor space from a ceiling of the indoor space; an outdoor air processing unit connected to the intake unit, the outdoor air processing unit being configured to supply outdoor air while exhausting the return air taken in via the intake unit to outdoors; an air conditioner connected to the intake unit and the outdoor air processing unit, the air conditioner being configured to supply, as air-conditioning air, mixed air of the return air taken in via the intake unit and the outdoor air supplied by the outdoor air processing unit; and at least one radiation unit connected to the air conditioner and disposed in the indoor space in a manner to surround the intake unit, the radiation unit being configured to radiate heat of the air-conditioning air supplied by the air conditioner while discharging the air-conditioning air to the indoor space. The air conditioning system is configured to air-condition the indoor space so as to radiate the heat from the radiation unit while generating an induced air stream in the intake unit to ventilate the indoor space.

According to the above aspect, the air conditioning system performs not forced-convection air conditioning, but air conditioning in which to radiate heat while performing ventilation by generating an induced air stream. Therefore, the concentration of indoor harmful substances can be lowered while preventing respiratory droplets and aerosols from spreading, which makes it possible to reduce the risk of being infected with an infectious disease. In addition, the air conditioning system performs radiation air conditioning with no temperature irregularity, and thereby air conditioning that achieves both comfort and health safety can be performed.

The air conditioning system according to one aspect of the present disclosure may further include a plurality of the radiation units. The intake unit may be disposed, at a center of the indoor space, on a part of the ceiling. The radiation units may be disposed on or by a wall of the indoor space in a manner to surround the intake unit.

According to the above aspect, the air conditioning system is configured to discharge the air-conditioning air to the indoor space from the wall of the indoor space, and exhaust the indoor air of the indoor space from the part of the ceiling at the center of the indoor space. The air conditioning system thus configured is particularly suitable for a small indoor space, and is capable of reducing an air-stagnating region in the indoor space and ventilating the indoor space uniformly to every corner of the indoor space.

The air conditioning system according to one aspect of the present disclosure may further include a plurality of the intake units and a plurality of the radiation units. The radiation units may be disposed on the ceiling and/or on or by a wall of the indoor space.

According to the above aspect, the air conditioning system includes a plurality of the intake units, and also includes a plurality of the radiation units that are provided on the ceiling and/or on or by the wall of the indoor space. Therefore, the air conditioning system can perform comfortable air conditioning while suppressing ventilation irregularity even in a large indoor space.

In the air conditioning system according to one aspect of the present disclosure, the outdoor air processing unit may include a heat pump. The outdoor air processing unit may be configured to cause the outdoor air and the return air to indirectly exchange heat with each other via the heat pump.

According to the above aspect, the air conditioning system is capable of cooling or heating the outdoor air by subjecting the outdoor air to the indirect heat exchange utilizing the return air having high exergy, and thereby energy saving can be achieved.

The air conditioning system according to one aspect of the present disclosure may further include a clean unit configured to subject the return air taken in via the intake unit to ultraviolet irradiation and/or filtering.

According to the above aspect, the air conditioning system can assuredly purify the air by the clean unit. Therefore, the air conditioning system is optimally applicable to, for example, hospital rooms that are required to be highly clean.

The air conditioning system according to one aspect of the present disclosure may further include: a humidifier; and an ion generator configured to add ions to air. The humidifier may be configured to humidify the outdoor air supplied by the outdoor air processing unit. The ion generator may be disposed in the radiation unit, and configured to add the ions to air in the radiation unit.

According to the above aspect, the air conditioning system is, for example, capable of controlling the humidity of the outdoor air supplied by the outdoor air processing unit to an optimal relative humidity of about 50% by the humidifier, which is, for example, a steam humidifier. The air conditioning system discharges the air-conditioning air containing the humidity-controlled outdoor air to the indoor space, thereby making it possible to lower the generation rate and survival rate of indoor harmful substances, such as viruses, and help to improve the immunity of a person staying in the indoor space. The air conditioning system is further capable of discharging, to the indoor space, the air-conditioning air whose indoor harmful substance capturing effect has been increased by the ion generator. Therefore, the air conditioning system can keep the indoor environment comfortable and healthy even in a low-temperature and low-humidity season.

Embodiments

Hereinafter, an air conditioning system 100 according to one embodiment is described. FIG. 1 to FIG. 4 show one example of the configuration of the air conditioning system 100 according to the embodiment. The air conditioning system 100 includes an intake unit 1, at least one radiation unit 2, an air conditioner 3, an outdoor air processing unit 4, a clean unit 5, air volume adjusting dampers 6, and a controller 7. The air conditioning system 100 is configured to air-condition an indoor space IS so as to radiate heat from the radiation unit(s) 2 while increasing the inlet velocity of air in the intake unit 1 to generate an induced air stream in the intake unit 1 to ventilate the indoor space IS. For example, the indoor space IS is formed by a ceiling CE, walls WL, and a floor FL.

The intake unit 1, the radiation unit(s) 2, the air conditioner 3, the outdoor air processing unit 4, the clean unit 5, and the air volume adjusting dampers 6 are connected to each other by ducts 8 (the ducts 8 are represented by bold lines in the drawings) to allow air, such as outdoor air OA, return air RA, exhaust air EA, and supply air SA, to flow therebetween. The intake unit 1, the radiation unit(s) 2, the air conditioner 3, the outdoor air processing unit 4, the clean unit 5, and the air volume adjusting dampers 6 are, for example, installed inside the indoor space IS of, for example, a hospital or an office, or installed in a space outside the indoor space IS. Examples of the space outside the indoor space IS may include a ceiling plenum space CS, which is a space at the back of the ceiling CE, and a corridor CR. At corners C of the indoor space IS, the ceiling CE of the indoor space IS protrudes downward, and the walls WL of the indoor space IS protrude laterally. Parts of the ceiling CE that are not positioned at the corners C have a greater height than parts of the ceiling CE that are positioned at the corners C. As a result, indoor harmful substances tend to gather at the higher parts of the ceiling CE. This allows efficient exhaust of the harmful substances. At each corner C, a hollow space is formed by the ceiling CE and the walls WL. The hollow space can be effectively utilized, for example, by accommodating the duct(s) 8 therein. Thick dashed arrows in the drawings indicate air flow directions.

In the present embodiment, as a non-limiting example, the intake unit 1 is installed on the ceiling CE. Specifically, the intake unit 1 is disposed in the ceiling plenum space CS. The intake unit 1 is configured to take in the return air (indoor air) RA of the indoor space IS from the ceiling CE. The intake unit 1 includes at least one air velocity adjusting damper 9, which can increase and decrease the inlet velocity of the return air RA. The intake unit 1 includes inlets (not shown) that are open to the indoor space IS. The intake unit 1 is connected to each of the air conditioner 3 and the outdoor air processing unit 4 via the duct(s) 8. The intake unit 1 is capable of generating an induced air stream at each inlet by air suction actions of the air conditioner 3 and the outdoor air processing unit 4, taking in the return air RA by the induced air stream, and feeding the return air RA to the air conditioner 3 and the outdoor air processing unit 4.

In the present embodiment, as a non-limiting example, a plurality of radiation units 2 are disposed in the indoor space IS in a manner to surround the intake unit 1. Each radiation unit 2 is configured to radiate the heat of air-conditioning air to the indoor space IS while discharging the air-conditioning air to the indoor space IS as the supply air SA.

The intake unit 1 is provided, at the center of the indoor space IS, on a part of the ceiling CE. The radiation units 2 are provided on the internal corners of the walls WL of the indoor space IS, such that the radiation units 2 are radially arranged around the intake unit 1. In the illustrated example, the radiation units 2 are disposed vertically at the respective internal corners. Alternatively, the radiation units 2 may be disposed not on the internal corners, but on or by other portions of the walls WL.

The clean unit 5 includes, for example, an ultraviolet irradiation light source (not shown) and a special filter (not shown). The clean unit 5 is configured to subject indoor air harmful substances to ultraviolet irradiation by the ultraviolet irradiation light source and/or filtering by the special filter. The clean unit 5 can purify the air, for example, by inactivating viruses that are examples of the harmful substances. In the present embodiment, as a non-limiting example, the clean unit 5 is provided on the duct(s) 8 connecting between the intake unit 1 and the air conditioner 3, and is configured to purify the return air RA that is fed from the intake unit 1 to the air conditioner 3.

The air volume adjusting dampers 6 are configured to adjust an air-conditioning feed air volume and an outdoor-air-processing feed air volume. The air-conditioning feed air volume is an air volume fed to the air conditioner 3. The outdoor-air-processing feed air volume is an air volume fed to the outdoor air processing unit 4 (i.e., exhaust air volume). As a non-limiting example, the present embodiment includes a first air volume adjusting damper 6, which is disposed on the duct(s) 8 connecting between the intake unit 1 and the outdoor air processing unit 4, and a second air volume adjusting damper 6, which is disposed on the duct(s) 8 connecting between the outdoor air processing unit 4 and the air conditioner 3.

The first air volume adjusting damper 6 can adjust the air-conditioning feed air volume of the return air RA fed from the intake unit 1 to the air conditioner 3 and the outdoor-air-processing feed air volume of the return air RA fed from the intake unit 1 to the outdoor air processing unit 4, by adjusting the feed air volume of the duct(s) 8 connecting between the intake unit 1 and the outdoor air processing unit 4. For example, the first air volume adjusting damper 6 can adjust the feed air volume, such that the ratio between the air-conditioning feed air volume and the outdoor-air-processing feed air volume is 7:3. The second air volume adjusting damper 6 can adjust the outdoor-air-processing feed air volume of the outdoor air OA fed from the outdoor air processing unit 4 to the air conditioner 3.

The air conditioner 3 is connected to each of the intake unit 1, the plurality of radiation units 2, and the outdoor air processing unit 4 via the duct(s) 8. The air conditioner 3 includes a heat exchange coil 10 and an air feeder 11 in a body of the air conditioner 3. The air feeder 11 is configured to suck the return air RA into the body of the air conditioner 3 via the intake unit 1 and the clean unit 5. The air feeder 11 is configured to cause mixed air of the return air RA sucked via the intake unit 1 and the clean unit 5 and the outdoor air OA fed from the outdoor air processing unit 4 to pass through the heat exchange coil 10, and supply the mixed air that has passed through the heat exchange coil 10 to the radiation units 2 as air-conditioning air. The heat exchange coil 10 is configured to exchange heat with the mixed air of the outdoor air OA and the return air RA to adjust the temperature of the mixed air to a suitable temperature for indoor air conditioning.

The heat exchange coil 10 may adopt a heat exchange structure in which heat is exchanged between a heat exchange medium that is cold water or hot water and the mixed air (air-conditioning air), or a heat exchange structure in which heat is exchanged between a heat exchange medium that is a refrigerant such as chlorofluorocarbon and the mixed air (air-conditioning air), or a different heat exchange structure. In the illustrated example, the heat exchange coil 10 adopts a heat exchange structure in which heat is exchanged between cold or hot water W and the mixed air (air-conditioning air). The temperature of the cold or hot water W is adjusted by a heat source device (not shown) such as a chiller or a boiler. For example, the heat exchange coil 10 may include a heat transfer pipe group (not shown) and a fin group (not shown). The heat transfer pipe group is a group of heat transfer pipes through which the heat exchange medium flows, and the fin group is a group of fins through which air can pass. The heat exchange coil 10 may have a structure in which the heat transfer pipe group is connected to the fin group. The heat exchange medium and the passing air exchange heat with each other via the heat transfer pipe group and the fin group (not shown). Desirably, the heat transfer pipes are configured as elliptical pipes, but may be configured as circular pipes.

The outdoor air processing unit 4 is connected to each of the intake unit 1 and the air conditioner 3 via the duct(s) 8. The outdoor air processing unit 4 includes a heat pump 12, an air supply fan 13, an exhaust fan 14, a vaporizing humidifier 15, and a steam humidifier 16 in a body of the outdoor air processing unit 4. The exhaust fan 14 is configured to suck the return air RA into the body of the outdoor air processing unit 4 via the intake unit 1. The exhaust fan 14 is configured to exhaust the return air RA sucked via the intake unit 1 to the outdoors via the duct(s) 8. The air supply fan 13 is configured to suck the outdoor air OA from the outdoors into the body of the outdoor air processing unit 4 via the duct(s) 8. The air supply fan 13 is configured to supply the outdoor air OA sucked from the outdoors via the duct(s) 8 to the air conditioner 3.

The outdoor air processing unit 4 is configured to supply the outdoor air OA to the air conditioner 3 by the air supply fan 13 while exhausting the return air RA to the outdoors by the exhaust fan 14. The outdoor air OA sucked by the air supply fan 13 exchanges heat indirectly, via the heat pump 12, with the return air RA sucked by the exhaust fan 14, and then the outdoor air OA is supplied to the air conditioner 3. The outdoor air OA exchanges heat with the heat pump 12, and the return air RA also exchanges heat with the heat pump 12. The return air RA is the heat source air for the heat pump 12. The vaporizing humidifier 15 and the steam humidifier 16 are configured to humidify the outdoor air OA that has undergone the heat exchange with the heat pump 12.

The heat pump 12 includes a circulation circuit (not shown) for a refrigerant that is one example of the heat exchange medium. The heat pump 12 is configured to repeatedly perform a compression process, a condensation process, an expansion process, and an evaporation process in this order on the refrigerant that flows through the circulation circuit. The heat pump 12 is configured to cause the refrigerant and air to exchange heat with each other. The heat pump 12 is configured to, in the refrigerant evaporation process, absorb heat from the air that exchanges heat with the refrigerant, and in the refrigerant condensation process, radiate heat to the air that exchanges heat with the refrigerant.

The heat pump 12 includes at least: an outdoor air heat exchanger 17 and a heat source air heat exchanger 18 each capable of performing the refrigerant evaporation process and the refrigerant condensation process, the outdoor air heat exchanger 17 and the heat source air heat exchanger 18 being configured to perform different processes from each other between the refrigerant evaporation process and the refrigerant condensation process; a compressor 19 capable of compressing and conveying the refrigerant; a pressure reduction mechanism 20, such as an expansion valve, capable of expanding the refrigerant; and a switching mechanism 21, such as a valve, capable of switching a process to be performed between the refrigerant evaporation process and the refrigerant condensation process for each of the outdoor air heat exchanger 17 and the heat source air heat exchanger 18. The heat pump 12 is formed by connecting the outdoor air heat exchanger 17, the heat source air heat exchanger 18, the compressor 19, the pressure reduction mechanism 20, and the switching mechanism 21 by piping, such that the refrigerant circulates therethrough. For example, the switching mechanism 21 may be configured to switch the piping passages, such that the refrigerant flows through the outdoor air heat exchanger 17, the compressor 19, and the heat source air heat exchanger 18 in this order or in the reverse order.

Each of the outdoor air heat exchanger 17 and the heat source air heat exchanger 18 may have the same configuration as that of the heat exchange coil 10 of the air conditioner 3. Each of the outdoor air heat exchanger 17 and the heat source air heat exchanger 18 may include: a heat transfer pipe group through which the heat exchange medium (the refrigerant) flows; and a fin group through which air can pass. Each of the outdoor air heat exchanger 17 and the heat source air heat exchanger 18 may have a structure in which the heat transfer pipe group is connected to the fin group. The heat exchange medium and the passing air exchange heat with each other via the heat transfer pipe group and the fin group (not shown). Desirably, the heat transfer pipes are configured as elliptical pipes, but may be configured as circular pipes.

The plurality of radiation units 2 are each connected to the air conditioner 3 via the duct(s) 8. Each radiation unit 2 includes an air supply part 23, an air induction part 24, an air mixing part 25, an ion generator 22, and a heat storage plate group 27.

The air supply part 23 includes a supply chamber 23a and a discharge opening 23b. The air supply part 23 is connected to an air outlet of the air conditioner 3 via the duct(s) 8, and is configured such that the supply air from the air conditioner 3 is fed to the supply chamber 23a. The supply chamber 23a has such a shape that the inner cross section thereof decreases toward the discharge opening 23b. For example, the supply chamber 23a is tapered toward the discharge opening 23b. The discharge opening 23b is open so that the air can be discharged from the inside of the supply chamber 23a. The discharge opening 23b can function to restrict the outlet of the supply chamber 23a.

The air mixing part 25 includes a mixing chamber 25a, a receiving opening 25b, and a plurality of discharge holes 25c. The mixing chamber 25a has such a shape that the inner cross section thereof decreases toward the receiving opening 25b. For example, the mixing chamber 25a is tapered toward the receiving opening 25b. The receiving opening 25b is open so that air can be taken into the mixing chamber 25a. The receiving opening 25b can function to restrict the inlet of the mixing chamber 25a. The receiving opening 25b is disposed in a manner to face the discharge opening 23b via a gap 24aa. The plurality of discharge holes 25c are disposed at the opposite side of the mixing chamber 25a from the receiving opening 25b. The plurality of discharge holes 25c are open to the indoor space IS so that the air in the mixing chamber 25a can be discharged to the indoor space IS.

The air induction part 24 includes an induction chamber 24a and intake openings 24b. The induction chamber 24a is disposed between the air supply part 23 and the air mixing part 25. The induction chamber 24a includes, as a part thereof, the space forming the gap 24aa between the discharge opening 23b and the receiving opening 25b. The induction chamber 24a communicates with the supply chamber 23a via the discharge opening 23b, and communicates with the mixing chamber 25a via the receiving opening 25b. The intake openings 24b are open to the indoor space IS so that the air in the indoor space IS (i.e., the return air RA) can be taken into the induction chamber 24a.

The ion generator 22 is disposed in the air mixing part 25. Specifically, the ion generator 22 is disposed in a space 25d, which communicates with the mixing chamber 25a and also with the indoor space IS via the discharge holes 25c. The ion generator 22 is capable of adding ions to the air that flows from the mixing chamber 25a into the space 25d, and discharging the air to which the ions have been added to the indoor space IS.

The heat storage plate group 27 is disposed in the mixing chamber 25a of the air mixing part 25. The heat storage plate group 27 includes a plurality of plates that can absorb and store the heat of air that comes into contact therewith, and can also radiate the stored heat. The heat storage plate group 27 is disposed such that the stored heat can be radiated to the indoor space IS via the discharge holes 25c.

The supply air supplied from the air conditioner 3 to the air supply part 23 can generate, at the discharge opening 23b of the air supply part 23, a jet flow from the discharge opening 23b toward the receiving opening 25b of the air mixing part 25. The jet flow of the supply air causes an inducing effect at the gap 24aa between the discharge opening 23b and the receiving opening 25b, and by the inducing effect, the air in the indoor space IS (i.e., the return air RA) can be induced via the induction chamber 24a and the intake openings 24b of the air induction part 24. The supply air and the induced air (the return air RA), while being mixed together, flow into the mixing chamber 25a of the air mixing part 25 through the receiving opening 25b.

The mixed air of the supply air and the induced air in the mixing chamber 25a flows out of the mixing chamber 25a into the indoor space IS via the discharge holes 25c, and meanwhile, the heat of the mixed air is absorbed by the heat storage plate group 27. The heat stored by the heat storage plate group 27 is radiated to the indoor space IS via the discharge holes 25c. Further, the ion generator 22 adds ions to the mixed air in the mixing chamber 25a, the mixed air containing the outdoor air (OA) that has been humidified by the vaporizing humidifier 15 and the steam humidifier 16 of the outdoor air processing unit 4. The mixed air to which the ions have been added flows out to the indoor space IS via the discharge holes 25c of the space 25d. The mixed air to which the ions have been added can adsorb indoor harmful substances suspended in the indoor space IS, such as fumes, odors, fungi, viruses, and allergens.

The controller 7 is configured to control, at least, the operations of the air conditioner 3, the outdoor air processing unit 4, and the air volume adjusting dampers 6 to achieve a preset indoor environment. The indoor environment is evaluated based on indexes such as a temperature, humidity, carbon dioxide concentration, the amount of suspended dust, and the mass of indoor harmful substances. The controller 7 may be configured to include, for example, a microprocessor, various sensors, and other control equipment.

The controller 7 may include a computer. For example, the controller 7 may be configured to include an electronic circuit board, an electronic control unit, a microcomputer, and other electronic equipment, etc. The controller 7 may include a processor such as a CPU (Central Processing Unit) and memories such as a RAM (Random Access Memory), which is a volatile memory, and a ROM (Read-Only Memory), which is a nonvolatile memory.

The processor can form a computer system together with the RAM and ROM. The computer system of the controller 7 may realize the functions of the controller 7 by the processor executing a program stored in the ROM while using the RAM as a work area.

The functions of the controller 7 may be partly or entirely realized by the above computer system, or may be partly or entirely realized by a dedicated hardware circuit such as an electronic circuit or an integrated circuit, or may be partly or entirely realized by a combination of the above computer system and a hardware circuit. The processor may realize processes by a logic circuit or dedicated circuit formed on, for example, an IC (Integrated Circuit) chip or LSI (Large-Scale Integration). The processes may be realized by a plurality of integrated circuits, or may be realized by one integrated circuit.

Other Embodiments

Although the embodiment of the present disclosure has been described as above, the present disclosure is not limited to the above-described embodiment. That is, various modifications and improvements can be made within the scope of the present disclosure. For example, embodiments in which various modifications are implemented on the above embodiment, and embodiments in which components in different embodiments are combined, also fall within the scope of the present disclosure.

Figure 5:
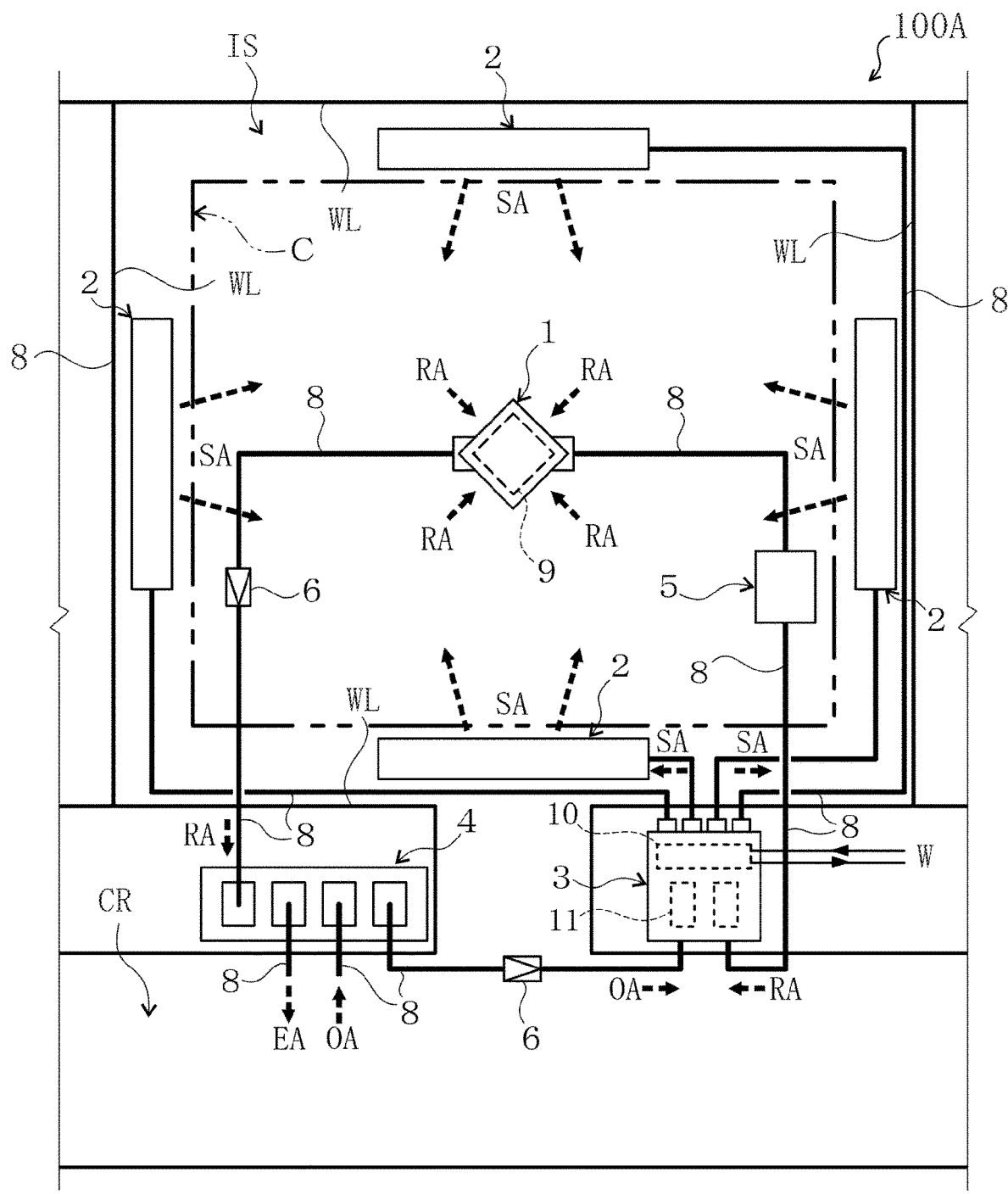
FIG. 5 is a schematic plan view showing one example of the configuration of an air conditioning system according to Variation 1.
Figure 6:
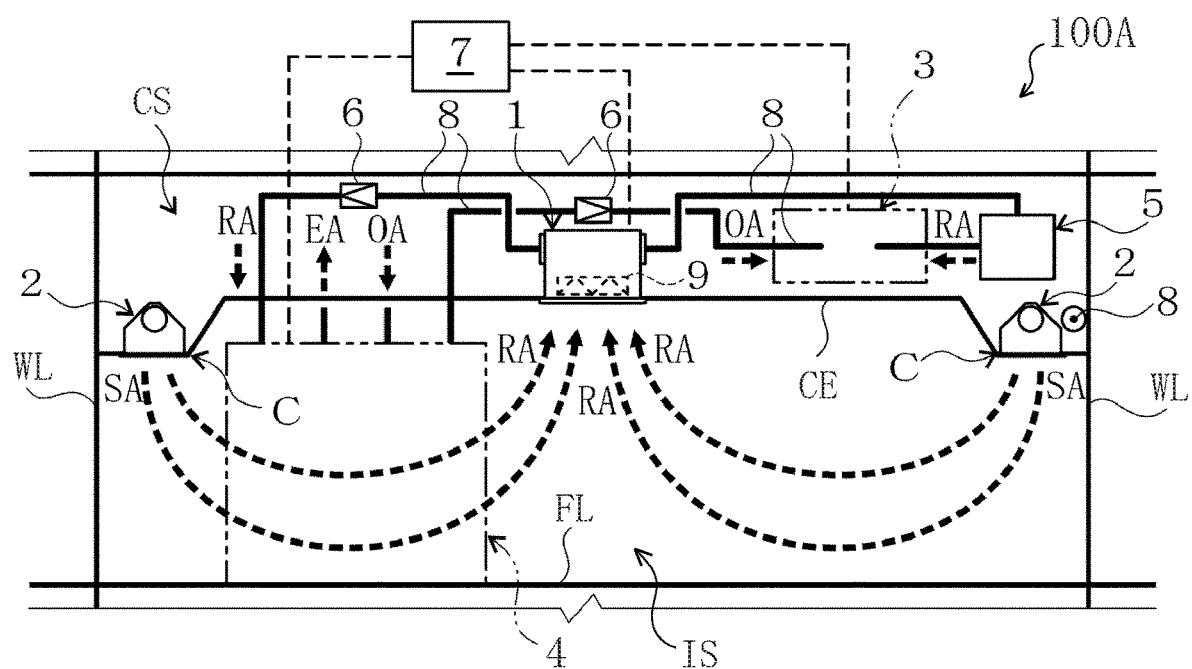
FIG. 6 is a schematic front view of the air conditioning system of FIG. 5.

For example, the air conditioning system of the present disclosure may be configured as in Variations described below. FIG. 5 and FIG. 6 show one example of the configuration of an air conditioning system 100A according to Variation 1. As shown in FIG. 5 and FIG. 6, the air conditioning system 100A according to Variation 1 is different from the air conditioning system 100 according to the above-described embodiment in the following point: in the air conditioning system 100A, the plurality of radiation units 2 are each disposed, at a non-corner end position in the indoor space IS, on parts of the ceiling CE (specifically, in the ceiling plenum space CS), such that the radiation units 2 are radially arranged around the intake unit 1. Except this point, the configuration of the air conditioning system 100A is the same as that of the air conditioning system 100 according to the above-described embodiment. In the present variation, four radiation units 2 are installed. Each radiation unit 2 has the same configuration as that described above in the embodiment. Each radiation unit 2 is connected to the air conditioner 3 via the duct(s) 8.

Figure 7:
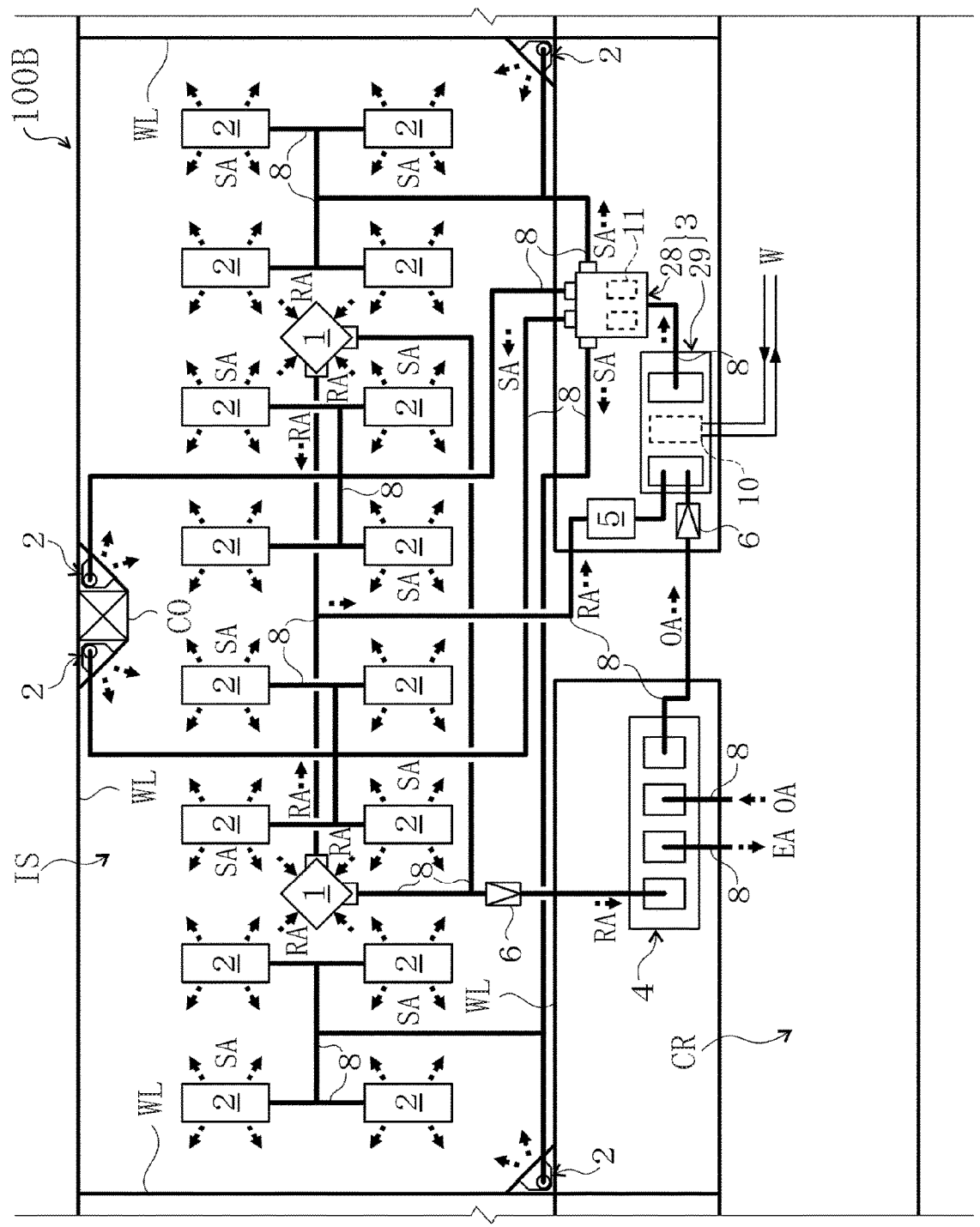
FIG. 7 is a schematic plan view showing one example of an air conditioning system according to Variation 2.

FIG. 7 shows one example of the configuration of an air conditioning system 100B according to Variation 2. The air conditioning system 100B according to Variation 2 is different from the air conditioning system 100 according to the above-described embodiment in the following points: the air conditioning system 100B includes a plurality of intake units 1; and further includes a plurality of radiation units 2 that are provided, in the indoor space IS, on the ceiling CE and/or on or by the walls WL (in the illustrated example, on internal corners of the walls WL and a pillar CO adjacent to one of the walls WL). In addition, the air conditioner 3 according to the present variation has a separate-type structure in which: the air conditioner 3 is divided into a fan unit 28 and a coil unit 29; and the fan unit 28 and the coil unit 29 are connected by the duct(s) 8. The fan unit 28 includes the air feeder 11 in a body of the fan unit 28. The coil unit 29 includes the heat exchange coil 10 in a body of the coil unit 29. Except these points, the configuration of the air conditioning system 100B is the same as the configuration of the air conditioning system 100 according to the above-described embodiment.

It should be noted that the technology of the present disclosure is not limited to the above-described embodiment and variations. The installation positions and the number of intake units 1, radiation units 2, air conditioners 3, and outdoor air processing units 4 can be modified freely. The air conditioner 3 can adopt various structures, such as the integrated structure shown in FIG. 1 and the separate-type structure shown in FIG. 7.

As the present disclosure may be embodied in several forms without departing from the spirit of essential characteristics thereof, the present embodiments and variations are therefore illustrative and not restrictive, since the scope of the present disclosure is defined by the appended claims rather than by the description preceding them, and all changes that fall within metes and bounds of the claims, or equivalence of such metes and bounds thereof are therefore intended to be embraced by the claims.

What is claimed is:

1. An air conditioning system comprising:
an intake unit configured to take in return air of an indoor space from a ceiling of the indoor space;
an outdoor air processing unit connected to the intake unit, the outdoor air processing unit being configured to supply outdoor air while exhausting the return air taken in via the intake unit to outdoors;
an air conditioner connected to the intake unit and the outdoor air processing unit, the air conditioner being configured to supply, as air-conditioning air, mixed air of the return air taken in via the intake unit and the outdoor air supplied by the outdoor air processing unit; and
at least one radiation unit connected to the air conditioner and disposed in the indoor space in a manner to surround the intake unit, the radiation unit being configured to radiate heat of the air-conditioning air supplied by the air conditioner while discharging the air-conditioning air to the indoor space, wherein
the air conditioning system is configured to air-condition the indoor space so as to radiate the heat from the radiation unit while generating an induced air stream in the intake unit to ventilate the indoor space.

2. The air conditioning system according to claim 1, further comprising a plurality of the radiation units, wherein
the intake unit is disposed, at a center of the indoor space, on a part of the ceiling, and
the radiation units are disposed on or by a wall of the indoor space in a manner to surround the intake unit.

3. The air conditioning system according to claim 1, further comprising a plurality of the intake units and a plurality of the radiation units, wherein
the radiation units are disposed on the ceiling and/or on or by a wall of the indoor space.

4. The air conditioning system according to claim 1, wherein
the outdoor air processing unit includes a heat pump, and
the outdoor air processing unit is configured to cause the outdoor air and the return air to indirectly exchange heat with each other via the heat pump.

5. The air conditioning system according to claim 2, wherein
the outdoor air processing unit includes a heat pump, and
the outdoor air processing unit is configured to cause the outdoor air and the return air to indirectly exchange heat with each other via the heat pump.

6. The air conditioning system according to claim 3, wherein
the outdoor air processing unit includes a heat pump, and
the outdoor air processing unit is configured to cause the outdoor air and the return air to indirectly exchange heat with each other via the heat pump.

7. The air conditioning system according to claim 1, further comprising a clean unit configured to subject the return air taken in via the intake unit to ultraviolet irradiation and/or filtering.

8. The air conditioning system according to claim 2, further comprising a clean unit configured to subject the return air taken in via the intake unit to ultraviolet irradiation and/or filtering.

9. The air conditioning system according to claim 3, further comprising a clean unit configured to subject the return air taken in via the intake unit to ultraviolet irradiation and/or filtering.

10. The air conditioning system according to claim 4, further comprising a clean unit configured to subject the return air taken in via the intake unit to ultraviolet irradiation and/or filtering.

11. The air conditioning system according to claim 5, further comprising a clean unit configured to subject the return air taken in via the intake unit to ultraviolet irradiation and/or filtering.

12. The air conditioning system according to claim 6, further comprising a clean unit configured to subject the return air taken in via the intake unit to ultraviolet irradiation and/or filtering.

13. The air conditioning system according to claim 1, further comprising:
a humidifier; and
an ion generator configured to add ions to air, wherein
the humidifier is configured to humidify the outdoor air supplied by the outdoor air processing unit, and
the ion generator is disposed in the radiation unit, and configured to add the ions to air in the radiation unit.

14. The air conditioning system according to claim 2, further comprising:
a humidifier; and
an ion generator configured to add ions to air, wherein
the humidifier is configured to humidify the outdoor air supplied by the outdoor air processing unit, and
the ion generator is disposed in the radiation unit, and configured to add the ions to air in the radiation unit.

15. The air conditioning system according to claim 3, further comprising:
a humidifier; and
an ion generator configured to add ions to air, wherein
the humidifier is configured to humidify the outdoor air supplied by the outdoor air processing unit, and
the ion generator is disposed in the radiation unit, and configured to add the ions to air in the radiation unit.

16. The air conditioning system according to claim 4, further comprising:
a humidifier; and
an ion generator configured to add ions to air, wherein
the humidifier is configured to humidify the outdoor air supplied by the outdoor air processing unit, and
the ion generator is disposed in the radiation unit, and configured to add the ions to air in the radiation unit.

17. The air conditioning system according to claim 7, further comprising:
a humidifier; and
an ion generator configured to add ions to air, wherein
the humidifier is configured to humidify the outdoor air supplied by the outdoor air processing unit, and
the ion generator is disposed in the radiation unit, and configured to add the ions to air in the radiation unit.

18. The air conditioning system according to claim 8, further comprising:
a humidifier; and
an ion generator configured to add ions to air, wherein
the humidifier is configured to humidify the outdoor air supplied by the outdoor air processing unit, and
the ion generator is disposed in the radiation unit, and configured to add the ions to air in the radiation unit.

19. The air conditioning system according to claim 9, further comprising:
a humidifier; and
an ion generator configured to add ions to air, wherein
the humidifier is configured to humidify the outdoor air supplied by the outdoor air processing unit, and
the ion generator is disposed in the radiation unit, and configured to add the ions to air in the radiation unit.

20. The air conditioning system according to claim 10, further comprising:
a humidifier; and
an ion generator configured to add ions to air, wherein
the humidifier is configured to humidify the outdoor air supplied by the outdoor air processing unit, and
the ion generator is disposed in the radiation unit, and configured to add the ions to air in the radiation unit.

* * * * *